United States Patent
Jiang et al.

(10) Patent No.: US 8,502,766 B2
(45) Date of Patent: Aug. 6, 2013

(54) FLAT DISPLAY PANEL AND ACTIVE DEVICE ARRAY SUBSTRATE AND LIGHT-ON TESTING METHOD THEREOF

(75) Inventors: Yi-Syuan Jiang, Hsinchu (TW); Wei-Lun Su, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 939 days.

(21) Appl. No.: 12/345,839

(22) Filed: Dec. 30, 2008

(65) Prior Publication Data
US 2010/0097297 A1    Apr. 22, 2010

(30) Foreign Application Priority Data
Oct. 17, 2008    (TW) ................................ 97139975 A

(51) Int. Cl.
*G09G 3/36* (2006.01)
*G09G 3/30* (2006.01)

(52) U.S. Cl.
USPC .................. 345/98; 345/76; 345/87; 349/40; 324/527

(58) Field of Classification Search
None
See application file for complete search history.

(56) References Cited

U.S. PATENT DOCUMENTS
6,246,074 B1 * 6/2001 Kim et al. ........................ 257/48
2003/0122975 A1   7/2003 Kim et al.

FOREIGN PATENT DOCUMENTS
CN    1955792 A    5/2007
TW    200831918 A   8/2008

OTHER PUBLICATIONS
Taiwan Official Action issued on Jun. 11, 2012.

* cited by examiner

*Primary Examiner* — Andrew L Sniezek
(74) *Attorney, Agent, or Firm* — Chun-Ming Shih

(57) ABSTRACT

A flat display panel and an active device array substrate and a light-on testing method thereof are provided. The active device array substrate comprises a plurality of first pixel units, a plurality of second pixel units, a first light-on testing circuit, a second light-on testing circuit and a plurality of sets of signal lines. The first light-on testing circuit and the second light-on testing circuit disposed in a peripheral circuit region of the active device array substrate are electrically connected with the first pixel units and the second pixel units disposed in a display region of the active device array substrate respectively. Each two adjacent sets of signal lines disposed in the peripheral circuit region of the active device array substrate are alternatively electrically connected to the first pixel units or the second pixel units respectively. When a testing signal inputted to first/second pixel units through the first/second light-on testing circuit results in any second/first pixel units being lighted-on, there are at least two adjacent sets of signal lines shorted to each other.

13 Claims, 9 Drawing Sheets

FLAT DISPLAY PANEL AND ACTIVE DEVICE ARRAY SUBSTRATE AND LIGHT-ON TESTING METHOD THEREOF

BACKGROUND

1. Field of the Invention

The invention relates to a flat display panel, and more particularly, to a flat display panel and an active device array substrate and a light-on testing method thereof.

2. Description of the Related Art

Since flat display panels have the advantages of small size and light weight, thus they are widely applied on various electronic products.

During the fabrication process of the flat display panel, a light-on testing process is usually performed before bonding the driving IC to the display panel to confirm if each pixel of the display panel can be operated normally for display images. FIG. 1 is a diagram illustrating a conventional flat display panel. Referring to FIG. 1, the flat display panel 100 having a display region 102 and a peripheral circuit region 104, wherein there are a plurality of pixel units 110 disposed in the display region 102 and a light-on testing circuit 120, contact pads and signal lines 140 disposed in the peripheral circuit region 104.

The signal lines 140 are so-called fan-out lines, wherein each signal line 140 is electrically connected to single line of pixel units 110. The light-on testing circuit 120 is electrically connected to all the pixel units 110 in the display region 102, such that a testing signal is inputted to all the pixel units 110 through the light-on testing circuit 120 to perform light-on test to all the pixel units 110.

As the aforementioned description, the testing signal is inputted to the pixel unit 110 in the display region 102 through the light-on testing circuit 120 during the conventional light-on testing process and another test process is performed to check whether the signal lines 140 have defects or not after bonding the driving IC(s) used for driving the pixel units 110 on the contact pads 130 and lots resources have already been consumed.

BRIEF SUMMARY

Therefore, the invention provides an active device array substrate with circuit layout used for detecting the defects of the signal lines during the light-on process.

The invention also provides a flat display panel for being detected the defects of the signal lines thereof during the light-on testing process.

The invention further provides a light-on testing method of flat display panel for detecting the defects of the signal lines during the light-on testing process.

The invention provides an active device array substrate with a display region and a peripheral circuit region comprising a plurality of first pixel units, a plurality of second pixel units, a first light-on testing circuit, a second light-on testing circuit and a plurality of sets of signal lines. The first pixel units and the second pixel units are arrayed in the display region of the active device array substrate. The first light-on testing circuit is disposed in the peripheral circuit region and connected to the first pixel units. The second light-on testing circuit is disposed in the peripheral circuit region and connected to the second pixel units. The sets of signal lines are disposed in the peripheral circuit region, and each two adjacent sets of signal lines are alternatively electrically connected to the first pixel units or the second pixel units, respectively.

The invention provides a flat display panel comprising the aforementioned active device array substrate, transparent layer and display layer. The transparent layer is disposed above the active device array substrate, and the display layer is disposed between the active device array substrate and the transparent layer.

In one embodiment of the invention, each set of signal line(s) disposed on the active device array substrate comprises a signal line, and the signal lines are formed in the same layer.

In one embodiment of the invention, each set of signal line(s) disposed on the active device array substrate comprises a plurality of signal lines formed in different layers.

In one embodiment of the invention, the transparent layer is a transparent substrate or a transparent protective layer.

In one embodiment of the invention, the display layer is a liquid crystal layer, an electro-phoretic layer, an electro-wetting layer or an organic electro-luminescent layer.

In one embodiment of the invention, the active device array substrate further comprises third light-on testing circuit and a plurality of contact pads. The third light-on testing circuit is disposed in the peripheral circuit region. One end of each contact pad is electrically connected to the third light-on testing circuit and the other end of each contact pad is electrically connected to the sets of signal line(s).

The invention provides a light-on testing method comprising the step of inputting a testing signal through the first light-on testing circuit and the second light-on testing circuit respectively to light-on the first pixel units and the second pixel units alternately. Sequentially, determining if the second pixel units are lighted-on when the testing signal is inputted through the first light-on testing circuit or determining if the first pixel units are lighted-on when the testing signal is inputted through the second light-on testing circuit.

The invention provides a light-on testing method comprising the steps of inputting a testing signal through the third light-on testing circuit, and then determining if the first pixel units and the second pixel units are lighted-on.

The invention provides an active device array substrate with a display region and a peripheral circuit region comprising a plurality of pixel units, a plurality of signal lines, light-on testing circuit and a plurality of contact pads. The pixel units are arrayed in the display region, and the signal lines are disposed in the peripheral circuit region and connected with the pixel units. The light-on testing circuit and the contact pads are also disposed in the peripheral circuit region, and each contact pad is electrically connected between the light-on testing circuit and one of the signal lines, respectively.

The invention provides a flat display panel comprising the aforementioned active device array substrate, transparent layer and display layer. The transparent layer is disposed above the active device array substrate, and the display layer is disposed between the active device array substrate and the transparent layer.

In one embodiment of the invention, the transparent layer is a transparent substrate or a transparent protective layer.

In one embodiment of the invention, the display layer is a liquid crystal layer, an electro-phoretic layer, an electro-wetting layer or an organic electro-luminescent layer.

The invention provides a light-on testing method comprising the steps of inputting a testing signal through the light-on testing circuit, and then determining if the pixel units are lighted-on.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
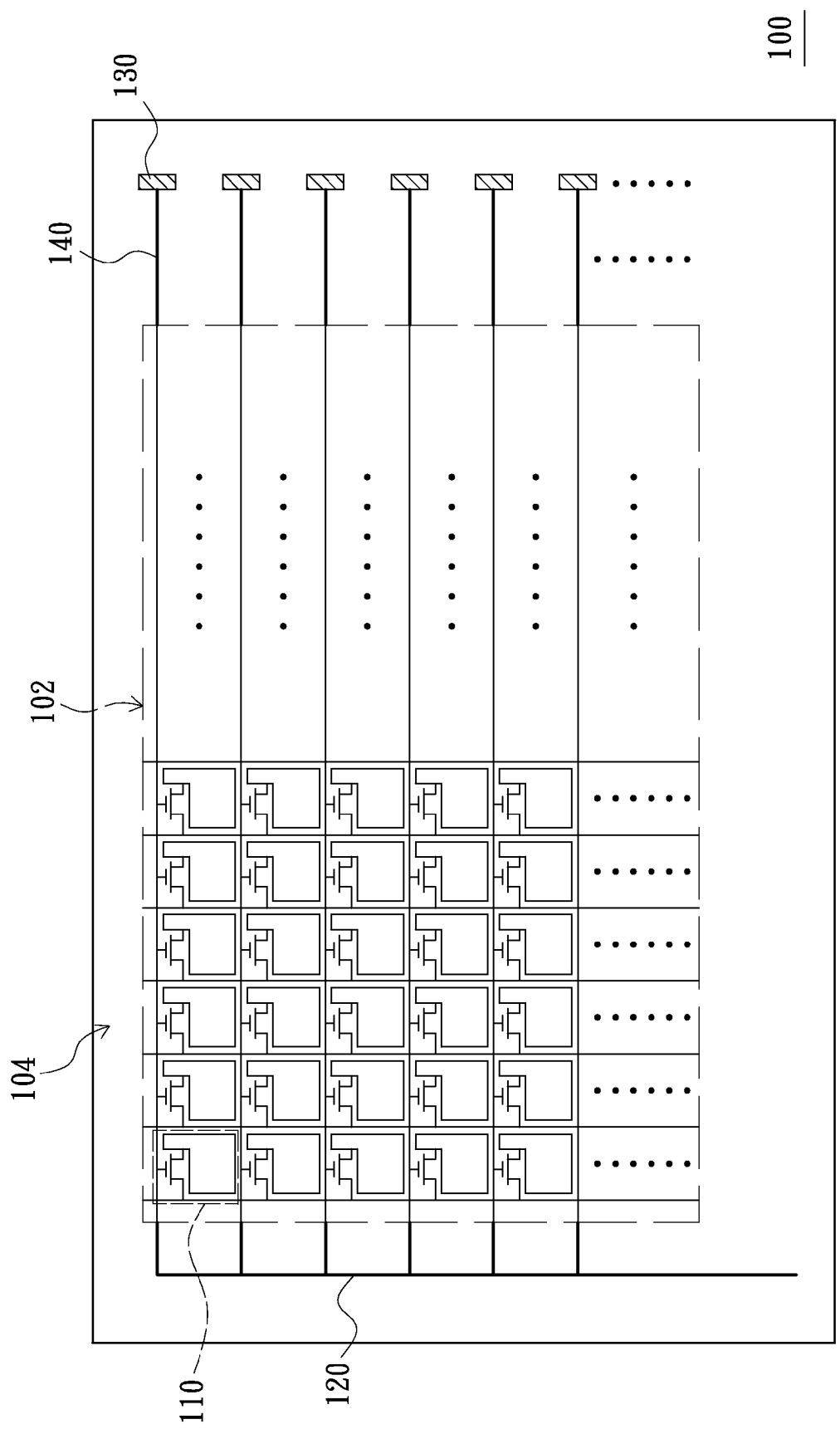
FIG. 1 is a diagram illustrating a conventional flat display panel.
Figure 2:
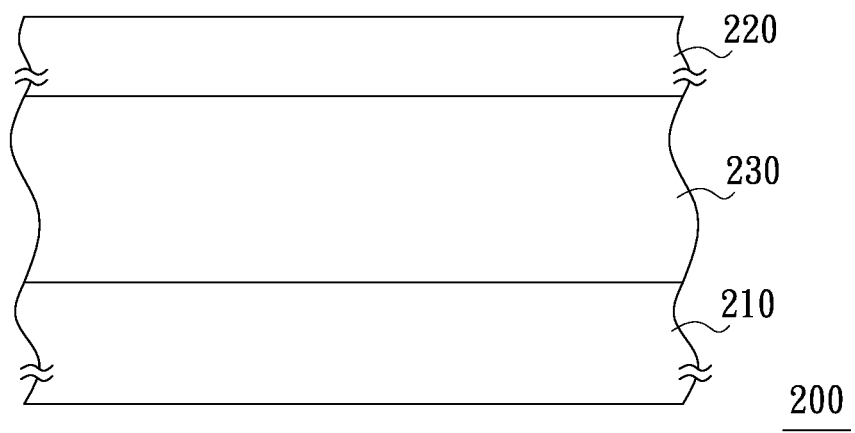
FIG. 2 is a cross-section diagram illustrating a flat display panel of the invention
Figure 3:
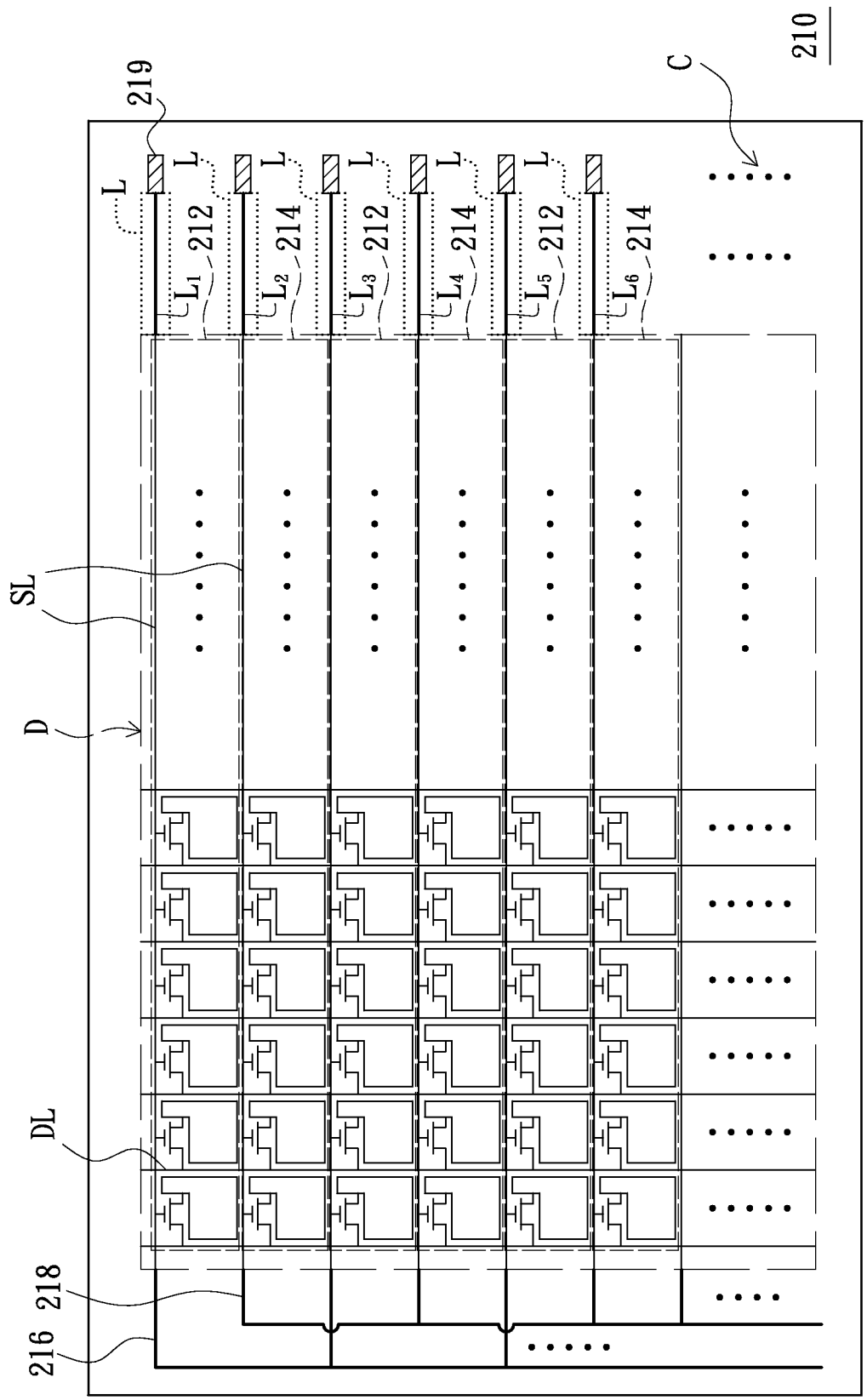
FIG. 3 is a diagram illustrating an active device array substrate in accordance with an embodiment of the present invention.

FIG. 2 is a cross-section diagram illustrating the flat display panel in accordance with an embodiment of the present invention, and FIG. 3 is a diagram illustrating the active device array substrate in accordance with an embodiment of the present invention. Referring FIGS. 2 and 3, flat display panel 200 comprises an active device array substrate 210, a transparent layer 220 and a display layer 230. The transparent layer 220 is disposed above the active device array substrate 210, and the display layer 230 is disposed between the active device array substrate 210 and transparent layer 220.

Specifically, flat display panel 200 may be a liquid crystal display (LCD) panel or an organic electro-luminescent display (OELD) panel. In another word, the display layer 230 may be a liquid crystal layer or an organic electro-luminescent layer, and the transparent layer 220 may be a transparent substrate of glass. Besides, flat display panel 200 may be an electro-phoretic display (EPD) panel or an electro-wetting display (EWD) panel. Thus, the display layer 230 may be an electro-phoretic layer or an electro-wetting layer, and the transparent layer 230 may be a transparent protective layer.

Referring to FIG. 3, the active device array substrate 210 having a display region D and a peripheral circuit region C comprises a plurality of first pixel units 212, a plurality of second pixel units 214, a first light-on testing circuit 216, a second light-on testing circuit 218 and a plurality of sets of signal line(s) L. The first pixel units 212 and the second pixel units 214 are arrayed in the display region D. The first light-on testing circuit 216, the second light-on testing circuit 218 and the sets of signal line(s) L are disposed in the peripheral circuit region C. The first light-on testing circuit 216 is electrically connected to the first pixel units 212, and the second light-on testing circuit 218 is electrically connected to the second pixel units 214. In detail, the first light-on testing circuit 216 and the second light-on testing circuit 218 may be connected to the scan lines SL or the data lines DL of the first pixel unit 212 and of the second pixel unit 214. In this embodiment, the first light-on testing circuit 216 and second light-on testing circuit 218 are, for example, electrically connected to the scan lines SL of the first pixel unit 212 and of the second pixel unit 214, respectively.

It should be noted that the each two adjacent sets of signal line(s) L of the active device array substrate 210 are alternatively electrically connected to the first pixel units 212 or the second pixel units 214, respectively. The sets of signal line(s) L are, for example the lines, so-called fan-out lines, used for connecting the contact pads 219 to the first pixel units 212 and the second pixel units 214. The contact pads 219 are used as the contact pads bonded with the driving IC (not shown) of the flat display panel 200 during the following processes.

In this embodiment, each set of signal line(s) L comprises one signal line respectively and the signal lines are indexed as L1, L2, and L3, and so on shown in FIG. 3. The signal line L1 is adjacent to the signal line L2, the signal line L2 is adjacent to the signal line L1 and the signal line L3, the signal line L3 is adjacent to signal line L2 and the signal line L4 and so forth. Moreover, the signal lines are formed of the same layer. For example, the signal lines L1, L2, L3, and so on may be formed during a process of the scan line SL of the first pixel units 212 or of the second pixel units 214.

Therefore, the signal lines L1, L3, L5, and so on are electrically connected to the first pixel units 212 and the signal lines L2, L4, L6, and so on are electrically connected to the second pixel units 214 in this embodiment.

Figure 4:
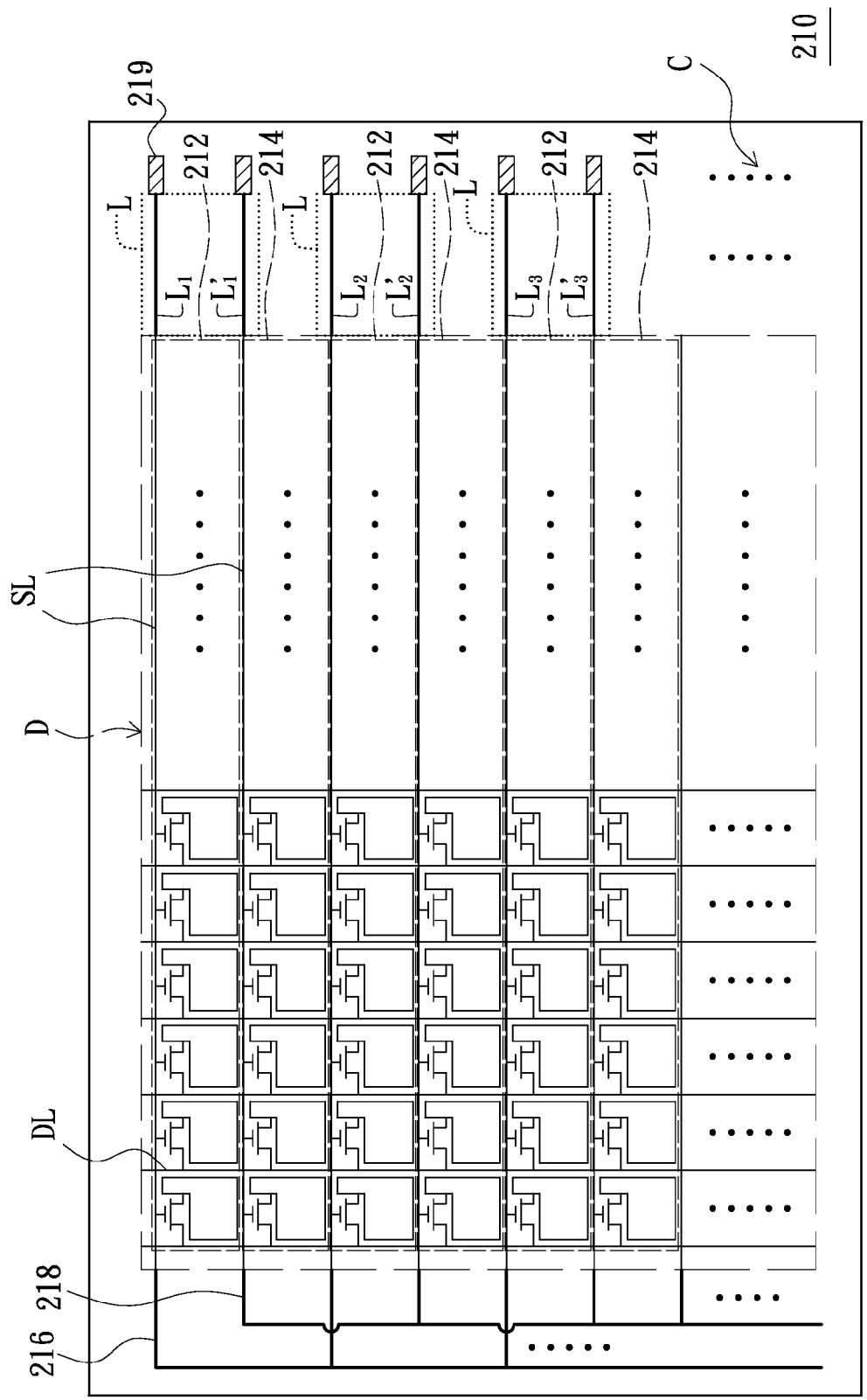
FIG. 4 is a diagram illustrating an active device array substrate in accordance with an embodiment of the present invention.

It should be noted that the number of the signal lines in each set of signal line(s) L is not limited in the invention although each set of signal line(s) L of the active device array substrate 210 illustrated in FIG. 3 merely comprises single signal line. In other words, each set of signal line(s) L may comprises one or more signal lines. FIG. 4 is a diagram illustrating the active device array substrate in accordance with an embodiment of the present invention, the differences between this embodiment and the aforementioned embodiment would be described in following paragraph.

Figure 5:
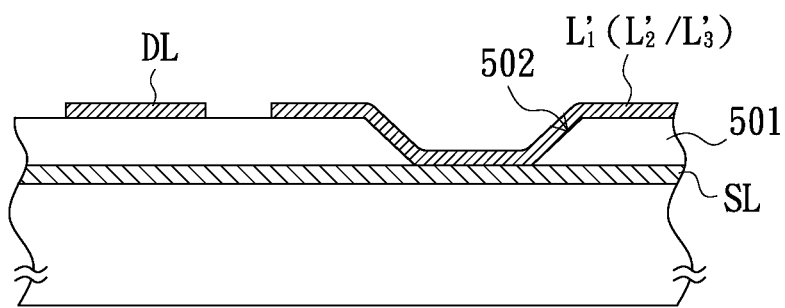
FIG. 5 is a diagram illustrating a partial cross-section of an active device array substrate in accordance with an embodiment of the present invention.

Referring to FIG. 4, each set of signal line(s) L comprises, for example, two signal lines respectively, such as the reference indices L1, L1' or L2, L2', and so forth shown in FIG. 4, and the signal lines L1, L2, L3, and so on are formed of different layer with the signal lines L1', L2', L3', and so on. For example, the signal lines L1, L2, L3, and so on may formed with the scan line SL of the first pixel units 212 or of the second pixel units 214 of the same layer. The signal line L1', L2', L3', and so on may formed with the data lines DL of the first pixel units 212 or of the second pixel units 214 of the same layer and electrically connected with the scan line SL through a contact hole 502 formed within the dielectric layer 501 disposed between the data lines DL and the scan line SL, as shown in FIG. 5.

Referring to FIG. 4 again, the two adjacent sets of signal line(s) L are alternatively electrically connected to the first pixel units 212 or the second pixel units 214, respectively. Specifically, the signal lines L1 and L1', the signal lines L3 and L3', and so on are electrically connected to the first pixel units 212, and the signal lines L2 and L2' are electrically connected to the second pixel units 214.

Referring to FIGS. 2, 3 and 4, the light-on testing method of the invention is performed by inputting a testing signal through the first light-on testing circuit 216 and the second light-on testing circuit 218 respectively into the display region D for lighting-on the first pixel units 212 and the second pixel units 214 alternately. If any second pixel unit 214 is lighted-on when the testing signal has been inputted through the first light-on testing circuit 216, there would be one of the signal lines L2, L4, L6, and so on (or L2 and L2') connected to the lighted-on second pixel units 214 shorted with at least one of the signal lines L1, L3, L5, and so on (or L1 and L1', L3 and L3', and so on) adjacent thereto.

Additionally, if any first pixel unit 212 is lighted-on when the testing signal has been inputted through the second light-on testing circuit 218, there would be one of the signal lines L1, L3, L5, and so on (or L1 and L1', L3 and L3', and so on) connected to the lighted-on first pixel units shorted with at least one of the signal lines L2, L4, L6, and so on (or L2 and L2') adjacent thereto. The light-on testing method will be described in detail in the following paragraph.

Figure 6:
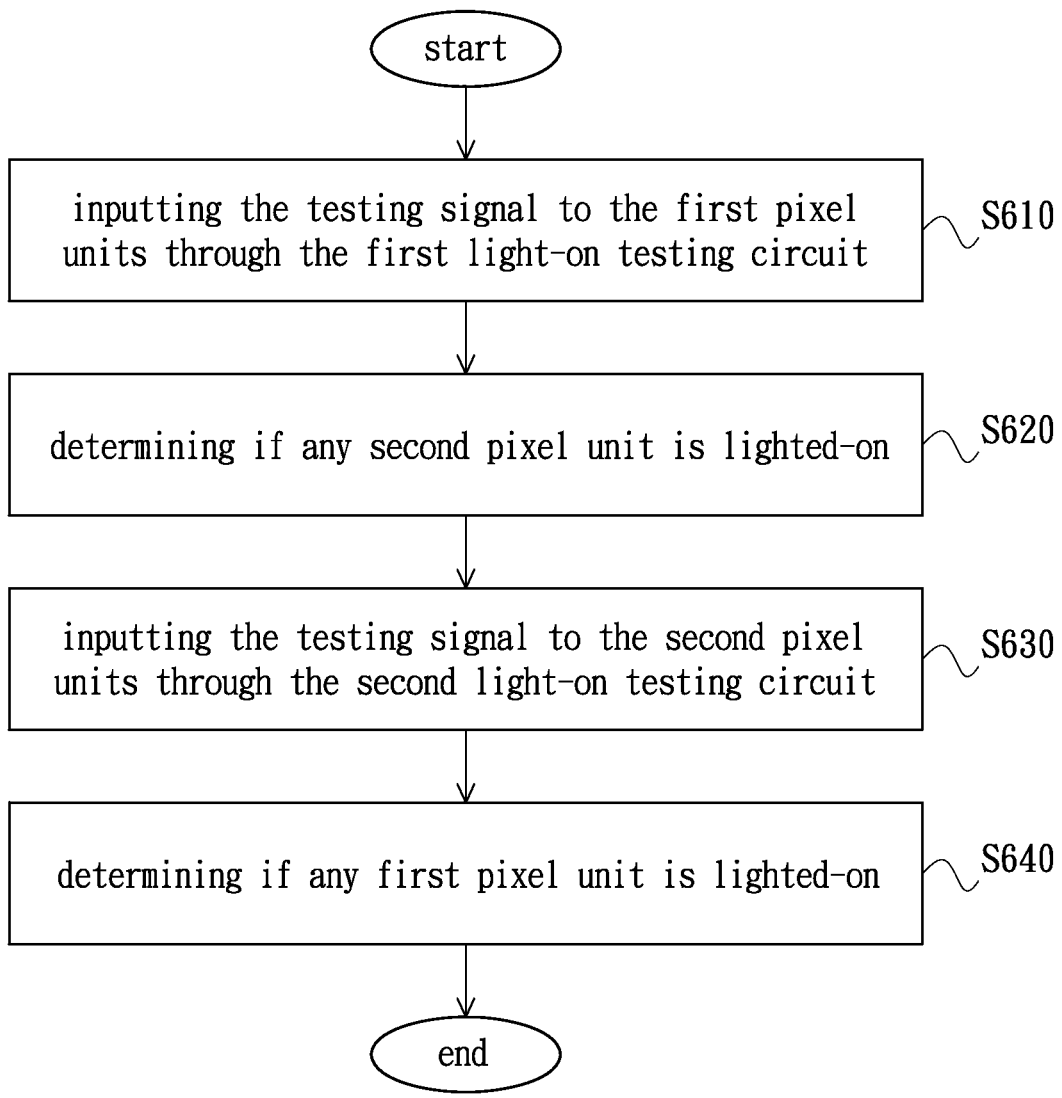
FIG. 6 is a flow chart diagram of the light-on testing process of the flat display panel illustrated in FIG. 2 in accordance with an embodiment of the present invention.

FIG. 6 is a flow chart diagram of the light-on testing process of the flat display panel illustrated in FIG. 2 in accordance with an embodiment of the present invention. Referring to FIGS. 2, 3 and 6, the testing signal is inputted to the first pixel units 212 through the first light-on testing circuit 216 in step S610. In step S620, it determines if any second pixel unit 214 is lighted-on. If there is any lighted-on second pixel unit 214, it means that the signal line connected to the lighted-on second pixel unit 214 is shorted with at least one of the signal lines adjacent thereto.

After completing the light-on testing of the first pixel units 212, the light-on testing of the second pixel units 214 is performed. In step S630, the testing signal is inputted to the second pixel units 214 through the second light-on testing circuit 218. In the step S640 following the step S630, it determines if any first pixel unit 212 is lighted-on. Similarly, if there is any lighted-on first pixel unit 212, it means that the signal line connected to the lighted-on first pixel unit 212 is shorted with at least one of the signal lines adjacent thereto.

It should be noted that the testing sequence of the first pixel units 212 and the second pixel units 214 is not limited in the invention. In another embodiment of the invention, step S610 and step S620 may be achieved sequentially after performing step S630 to step S640.

According to the aforementioned steps, the short-circuit of the signal lines connected to the first pixel units 212 and the second pixel units 214 may be detected during the light-on testing processes of the first pixel units 212 and the second pixel units 214. Additionally, the existence of opening-circuit of the signal lines connected to the first pixel units 212 and the second pixel units 214 may be detected during the light-on testing processes of the first pixel units 212 and the second pixel units 214. The method will be described in detail in the following paragraph.

Figure 7:
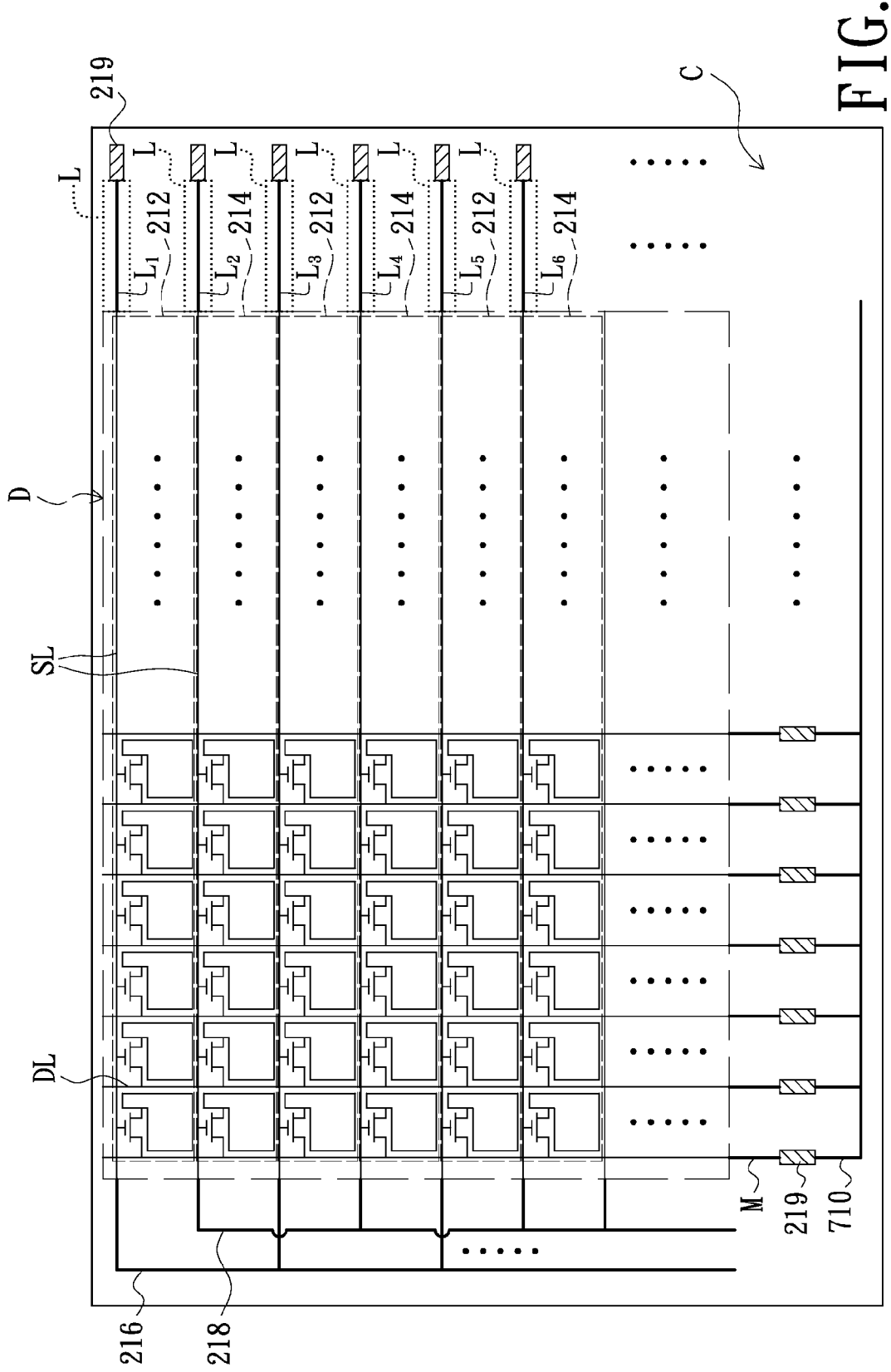
FIG. 7 is a diagram illustrating an active device array substrate in accordance with an embodiment of the present invention.

FIG. 7 is a diagram illustrating the active device array substrate in accordance with an embodiment of the present invention. Referring to FIG. 7, the active device array substrate 210 comprises first light-on testing circuit 216, second light-on testing circuit 218 and further comprises a third light-on testing circuit 710. The third light-on testing circuit 710 is also disposed in the peripheral circuit region C, wherein one end of each contact pad 219 is electrically connected to the third light-on testing circuit 710, and another end of each contact pad 219 is electrically connected to a signal line M so as to input a driving signal outputted from a driving IC bonded on the contact pad 219 during the following processes to the display region D.

Figure 8:
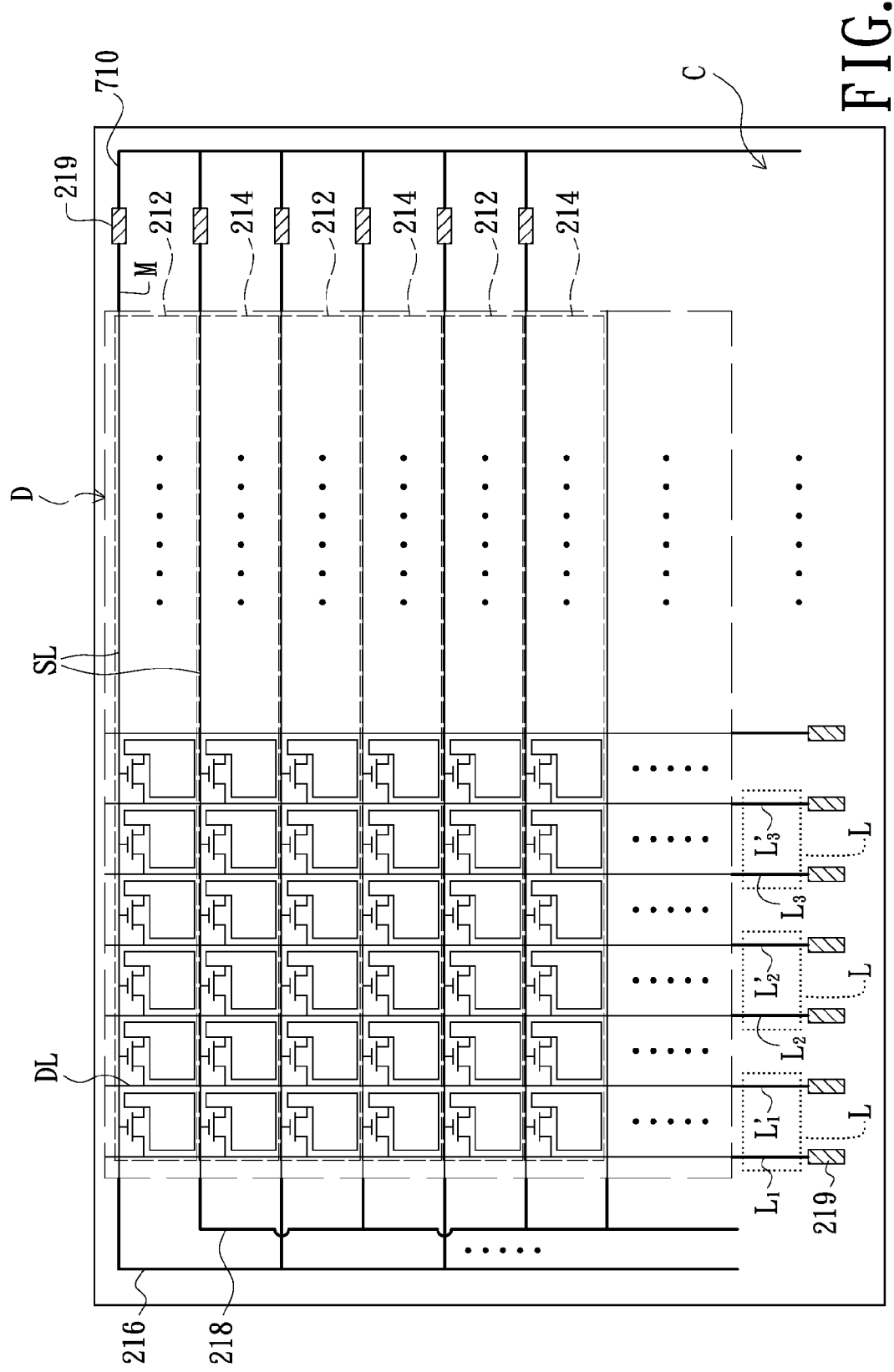
FIG. 8 is a diagram illustrating an active device array substrate in accordance with an embodiment of the present invention.

In this embodiment, the signal lines M electrically connected to the third light-on testing circuit 710 through the contact pads 219 may electrically connected to the data lines DL of the first pixel units 212 and of the second pixel units 214. In other embodiment, the signal lines M electrically connected to the third light-on testing circuit 710 through the contact pads 219 may electrically connected to the scan lines SL of the first pixel units 212 and of the second pixel units 214, as shown in FIG. 8. Furthermore, the signal line(s) of each set of signal line(s) L is/are electrically connected to the data lines DL of the first pixel units 212 and of the second pixel units 214. Besides, each set of signal line(s) L of the active device array substrate 210 in this embodiment may not only comprise single signal line, but comprise a plurality of signal lines as shown in FIG. 6. The detailed layout of each set of signal line(s) L is depicted in the aforementioned embodiments, so it doesn't give unnecessary detail here.

Figure 9:
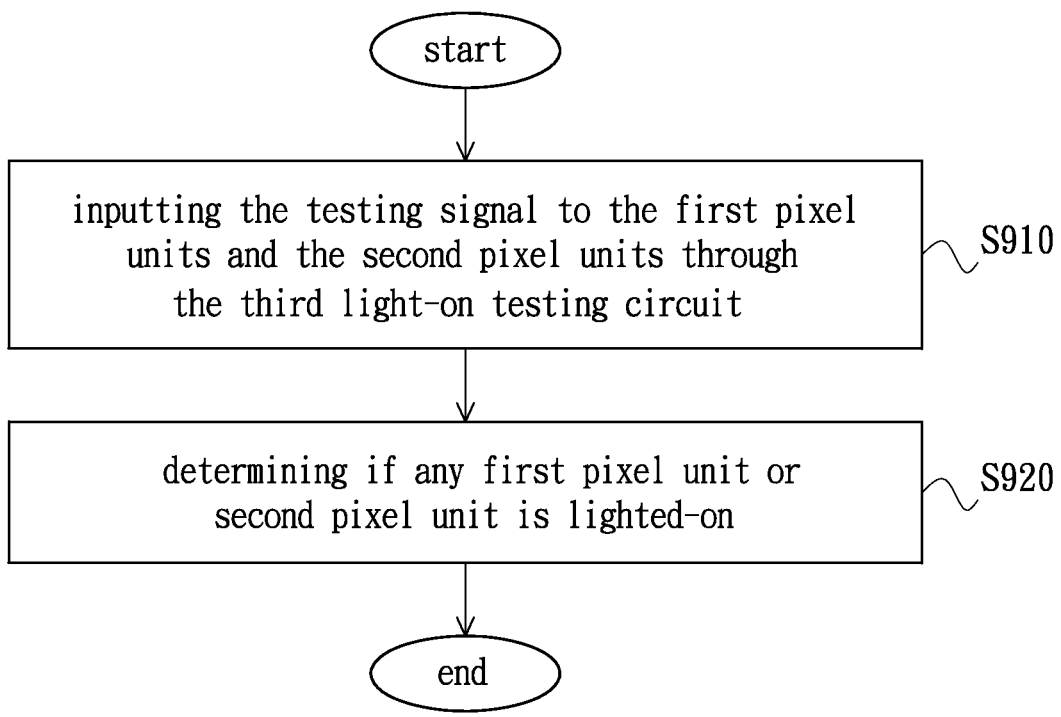
FIG. 9 is a flow chart diagram of the light-on testing process of a flat display panel comprising the active device array substrate illustrated in the FIG. 7 or 8.

FIG. 9 is a flow chart diagram of the light-on testing process of the flat display panel comprising the active device array substrate illustrated in the FIG. 7 or 8. Referring to FIGS. 7, 8 and 9, the testing signal may be inputted to first pixel units 212 or second pixel units 214 through the third light-on testing circuit 710 for detecting if any opening-circuit of the signal lines M connected with the contact pads 219 during the light-on testing process, as mentioned in step S910. Then, step S920 is performed for determining if all the first pixel units 212 and the second pixel units 214 are lighted-on. If there is any unlighted-on first pixel unit 212 or unlighted-on second pixel unit 214, an opening-circuit of the signal line M electrically connected to the unlighted-on first pixel unit 212 or the unlighted-on second pixel unit 214 is detected.

As described above, the signal lines of the flat display panel of the invention may short with each other are alternatively electrically connected to the first pixel units or the second pixel units, and the testing signal is inputted to the first pixel units and the second pixel units through the first light-on testing circuit and the second light-on testing circuit respectively during the light-on testing process of the invention. Therefore, if any second pixel unit is lighted-on when the testing signal has been inputted to the first pixel units through the first light-on testing circuit, there would exist short-circuit between the signal lines of the flat display panel.

Furthermore, the light-on testing signal also can be inputted to all the pixel units through the signal lines for determining if there exists opening-circuit of the signal lines based on whether each pixel unit has been lighted-on or not in the invention.

In summary, the short-circuit or opening-circuit of the signal lines respectively connected between the pixel unit and the contact pad may be detected during the light-on testing process of the flat display panel in the invention, so that the time consumed by the testing process before leaving the factory of the flat display panel may be decreased.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An active device array substrate with a display region and a peripheral circuit region, comprising:
    a plurality of first pixel units and a plurality of second pixel units arrayed in the display region, wherein each first pixel unit and each second pixel unit respectively comprise a scan line and a data line, each of the scan lines having a first end and a second end;
    a first light-on testing circuit disposed in the peripheral circuit region and connected to the first ends of the scan lines of the first pixel units;

a second light-on testing circuit disposed in the peripheral circuit region and connected to the first ends of the scan lines of the second pixel units;

a plurality of sets of first signal line(s) disposed in the peripheral circuit region, wherein each two adjacent sets of first signal line(s) are alternatively electrically connected to the second ends of the scan lines of the first pixel units and of the second pixel units respectively, so that each of the first pixel units connecting between the first light-on testing circuit and the corresponded one of the sets of first signal line(s), each of the second pixel unit connects between the second light-on testing circuit and the corresponded one of the sets of first signal line(s);

a plurality of first contact pads disposed in the peripheral circuit region, wherein the sets of first signal line(s) are electrically connected between the second ends of the scan lines of the first pixel units and the first contact pads and between the second ends of the scan lines of the second pixel units and the first contact pads, therefore the sets of first signal line(s) are detected for determining whether they shorted with each other by a plurality of first testing signals inputted through the first light-on testing circuit and the second light-on testing circuit for lighting-on the first pixel units and the second pixel units;

a plurality of sets of second signal line(s) disposed in the peripheral circuit region, and electrically connected to the data lines of the first pixel units and of the second pixel units respectively;

a third light-on testing circuit disposed in the peripheral circuit region; and a plurality of second contact pads disposed in the peripheral circuit region, wherein one end of each contact pad is electrically connected to the third light-on testing circuit and the other end of each contact pad is electrically connected to the sets of second signal lines, therefore the sets of second signal line(s) are detected for determining whether they have any disconnection by a second testing signal inputted through the third light-on testing circuit for lighting-on the first pixel units and the second pixel units.

2. The active device array substrate as recited in claim 1, wherein each set of first signal line(s) comprises a first signal line, and the first signal lines are formed in the same layer.

3. The active device array substrate as recited in claim 1, wherein each set of first signal line(s) comprises a plurality of first signal lines formed in different layers.

4. The active device array substrate as recited in claim 3, further comprising a dielectric layer disposed between the first signal lines in each set of first signal lines.

5. The active device array substrate as recited in claim 1, wherein the second contact pads are driving-chip contact pads.

6. A flat display panel, comprising:
an active device array substrate with a display region and a peripheral circuit region, comprising:
a plurality of first pixel units and a plurality of second pixel units arrayed in the display region, wherein each first pixel unit and each second pixel unit respectively comprise a scan line and a data line, each of the scan lines having a first end and a second end;
a first light-on testing circuit disposed in the peripheral circuit region and connected to the first ends of the scan lines of the first pixel units;

a second light-on testing circuit disposed in the peripheral circuit region and connected to the first ends of the scan lines of the second pixel units;

a plurality of sets of first signal line(s) disposed in the peripheral circuit region, wherein each two adjacent sets of first signal line(s) are alternatively electrically connected to the second ends of the scan lines of the first pixel units and of the second pixel units respectively, so that each of the first pixel units connecting between the first light-on testing circuit and the corresponded one of the sets of first signal line(s), each of the second pixel unit connects between the second light-on testing circuit and the corresponded one of the sets of first signal line(s);

a plurality of first contact pads disposed in the peripheral circuit region, wherein the sets of first signal line(s) are electrically connected between the second ends of the scan lines of the first pixel units and the first contact pads and between the second ends of the scan lines of the second pixel units and the first contact pads, therefore the sets of first signal line(s) are detected for determining whether they shorted with each other by a plurality of first testing signals inputted through the first light-on testing circuit and the second light-on testing circuit for lighting-on the first pixel units and the second pixel units;

a plurality of sets of second signal line(s) disposed in the peripheral circuit region, and electrically connected to the data lines of the first pixel units and of the second pixel units respectively;

a third light-on testing circuit disposed in the peripheral circuit region;

a plurality of second contact pads disposed in the peripheral circuit region, wherein one end of each contact pad is electrically connected to the third light-on testing circuit and the other end of each contact pad is electrically connected to the sets of second signal lines, therefore the sets of second signal line(s) are detected for determining whether they have any disconnection by a second testing signal inputted through the third light-on testing circuit for lighting-on the first pixel units and the second pixel units;

a transparent layer disposed above the active device array substrate; and a display layer disposed between the transparent layer and the active device array substrate.

7. The flat display panel as recited in claim 6, wherein each set of first signal line(s) comprises a first signal line and the first signal lines are formed in the same layer.

8. The flat display panel as recited in claim 6, wherein each set of first signal line(s) comprises a plurality of first signal lines formed in different layers.

9. The active device array substrate as recited in claim 8, further comprising a dielectric layer disposed between the first signal lines in each set of first signal lines.

10. The flat display panel as recited in claim 6, wherein the transparent layer is transparent substrate or transparent protecting film.

11. The flat display panel as recited in claim 6, wherein the display layer is liquid crystal layer, electro-phoretic layer, electro-wetting layer or organic electro-luminescent layer.

12. The flat display panel as recited in claim 6, wherein the second contact pads are driving-chip contact pads.

13. A light-on testing method used for testing a flat display panel, the flat display panel comprising a plurality of first pixel units, a plurality of second pixel units, a first light-on testing circuit, a second light-on testing circuit, a plurality of sets of first signal lines, a plurality of first contact pads, a plurality of second contact pads connected between a plurality of sets of second signal lines and a third light-on, wherein each first pixel unit and each second pixel unit respectively comprise a scan line and a data line, each scan line has a first end and a second end, each two adjacent sets of first signal lines alternatively electrically connected to the second ends of the scan lines of the first pixel units and the second pixel units respectively and the first light-on circuit and the second light-on circuit respectively electrically connected to the first ends of the scan lines of the first pixel units and the second pixel units, so that each of the first pixel units connecting between the first light-on testing circuit and the corresponded one of the first signal lines and each of the second pixel unit connects between the second light-on testing circuit and the corresponded one of the first signal lines, the sets of first signal line(s) are electrically connected between the second ends of the scan lines of the first pixel units and the first contact pads and between the second ends of the scan lines of the second pixel units and the first contact pads; the method comprising steps of:

inputting a plurality of first testing signals through the first light-on testing circuit and the second light-on testing circuit respectively to light-on the first pixel units and the second pixel units alternately;

determining if the second pixel units are lighted-on when the first testing signals are inputted through the first light-on testing circuit; and determining if the first pixel units are lighted-on when the first testing signals are inputted through the second light-on testing circuit;

inputting a second testing signal through the third light-on testing circuit; and determining if the first pixel units and the second pixel units are lighted-on.

* * * * *